(12) United States Patent
Linke

(10) Patent No.: US 12,337,920 B2
(45) Date of Patent: Jun. 24, 2025

(54) BICYCLE OPERATING APPARATUS

(71) Applicant: SRAM DEUTSCHLAND GmbH, Schweinfurt (DE)

(72) Inventor: Alexander Linke, Schonungen (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 17/360,548

(22) Filed: Jun. 28, 2021

(65) Prior Publication Data

US 2021/0323624 A1 Oct. 21, 2021

Related U.S. Application Data

(63) Continuation of application No. 16/870,489, filed on May 8, 2020, now Pat. No. 11,091,216.

(30) Foreign Application Priority Data

May 10, 2019 (DE) ...................... 10 2019 206 835.9

(51) Int. Cl.
   *B62J 6/16* (2020.01)
   *B62K 23/06* (2006.01)
   (Continued)

(52) U.S. Cl.
   CPC ................. *B62J 6/16* (2013.01); *B62K 23/06* (2013.01); *B62M 25/04* (2013.01); *G05G 1/04* (2013.01); *G05G 5/05* (2013.01); *G05G 2505/00* (2013.01)

(58) Field of Classification Search
   CPC .. G05G 1/00; G05G 1/04; G05G 5/05; G05G 2505/00; B62K 23/00; B62K 23/02;
   (Continued)

(56) References Cited

U.S. PATENT DOCUMENTS 8,955,863 B2 2/2015 Kosaka et al.
2009/0158881 A1* 6/2009 Shahana ................ B62M 25/04
74/502

(Continued)

FOREIGN PATENT DOCUMENTS

DE 102013020670 7/2014
EP 1375325 1/2004
(Continued)

*Primary Examiner* — Prasad V Gokhale

(57) ABSTRACT

A bicycle operating apparatus includes a carrier element having fastening device for fixing the apparatus to the handlebar; a housing, on the carrier element, having an electronic circuit arrangement in the housing; a first and a second switch, each connected to the electronic circuit arrangement, are on the housing; and an operating component mounted on the carrier element pivotable about an operating axis preloaded into a neutral position, the operating component deflected out of the neutral position in a first direction of rotation about the operating axis to actuate the first switch, and deflected out of the neutral position in a second direction opposite to the first direction to actuate the second switch, where the operating component includes a first operating element and a second operating element that are formed separately from one another in one piece and are mounted on the carrier element pivotable about the operating axis.

8 Claims, 11 Drawing Sheets

(51) Int. Cl.
*B62M 25/04* (2006.01)
*G05G 1/04* (2006.01)
*G05G 5/05* (2006.01)

(58) Field of Classification Search
CPC ....... B62K 23/06; B62M 25/00; B62M 25/04; B62J 6/16
See application file for complete search history.

(56) References Cited

U.S. PATENT DOCUMENTS

| | | | | |
|---|---|---|---|---|
| 2014/0208889 | A1* | 7/2014 | Kosaka | G05G 1/04 |
| | | | | 74/523 |
| 2014/0303859 | A1* | 10/2014 | Miki | B62M 25/08 |
| | | | | 701/60 |
| 2016/0231768 | A1* | 8/2016 | Appleton | B60K 26/02 |
| 2018/0341284 | A1* | 11/2018 | Mega | G05G 1/04 |
| 2019/0217916 | A1* | 7/2019 | Kakinoki | B62M 25/08 |

FOREIGN PATENT DOCUMENTS

| | | |
|---|---|---|
| EP | 3147194 | 3/2017 |
| WO | 2016128586 | 8/2016 |

* cited by examiner

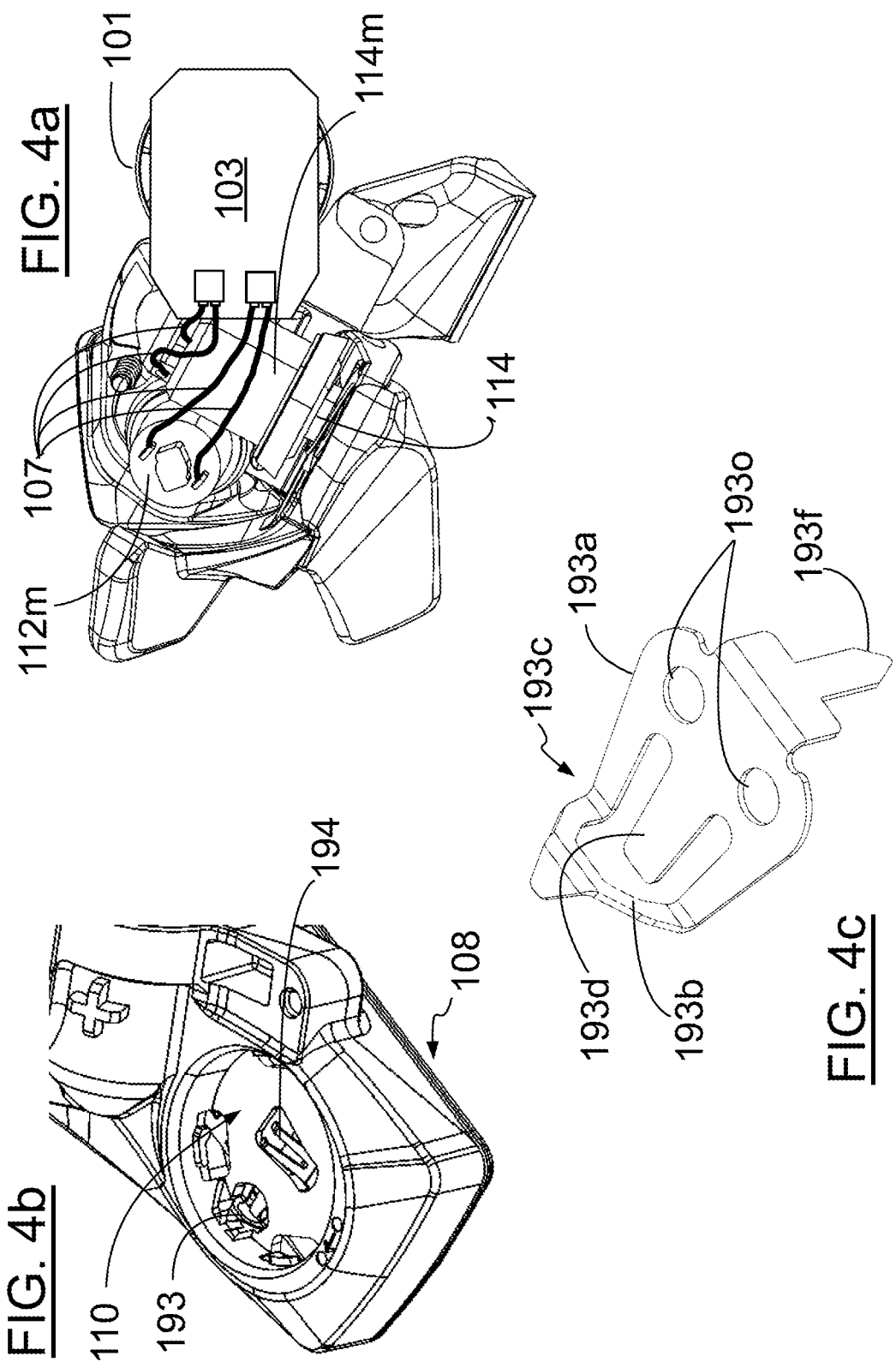

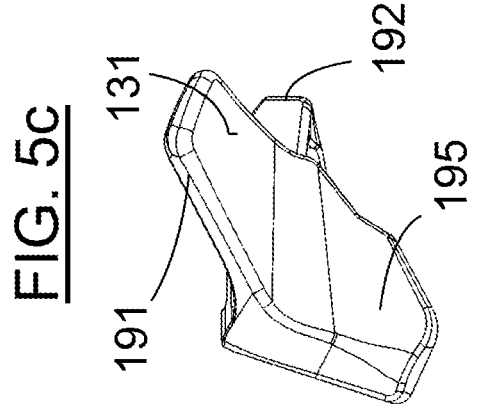
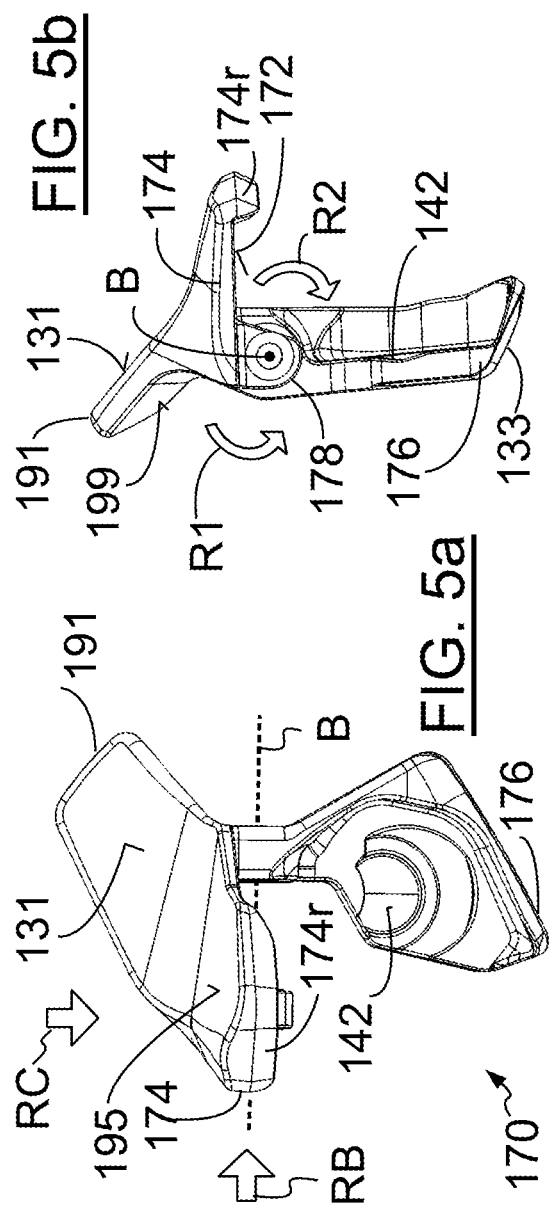
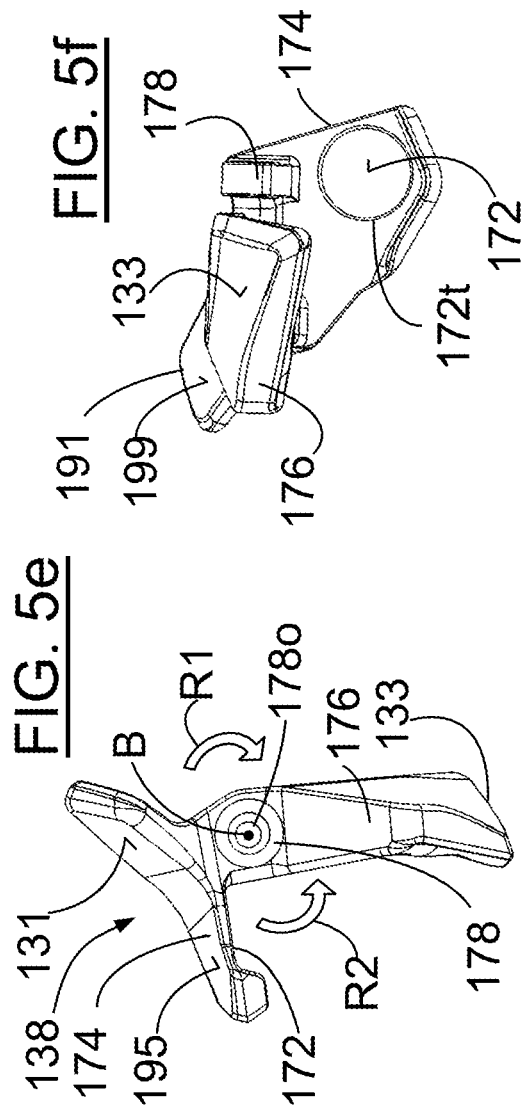

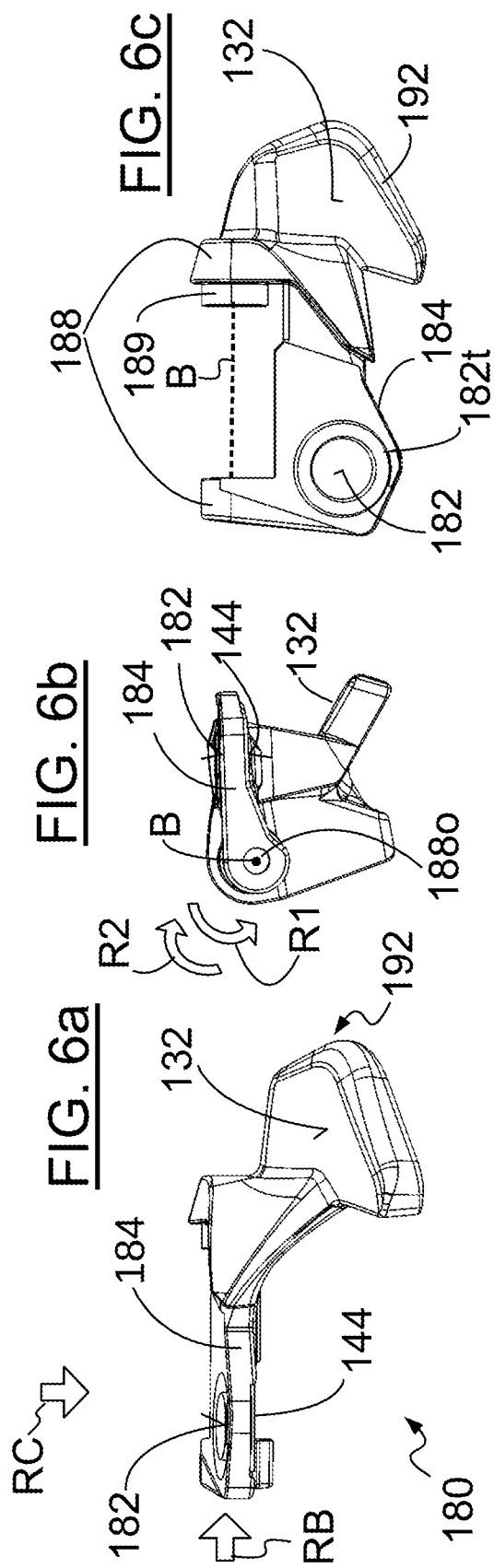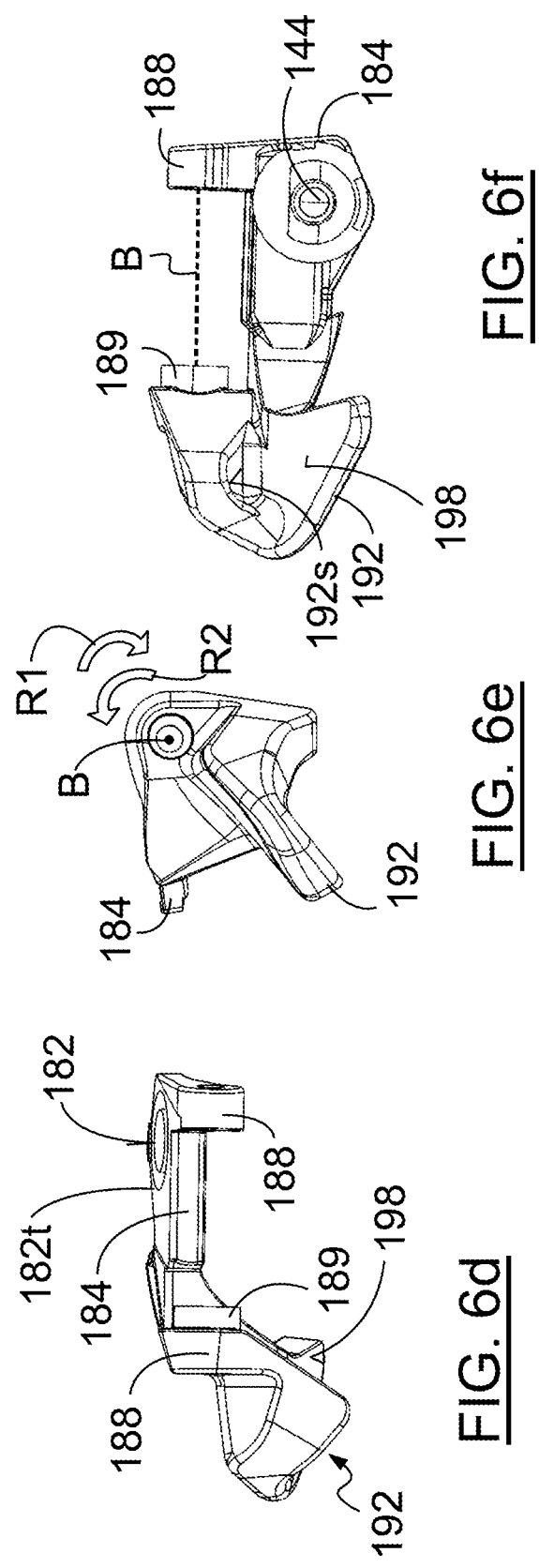

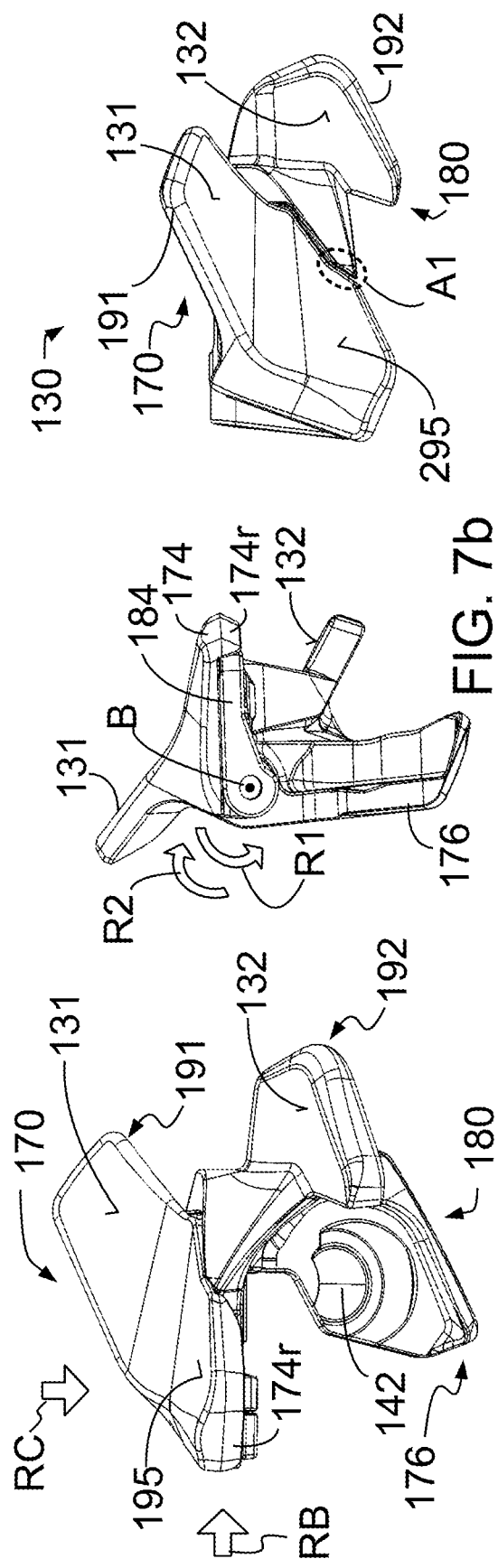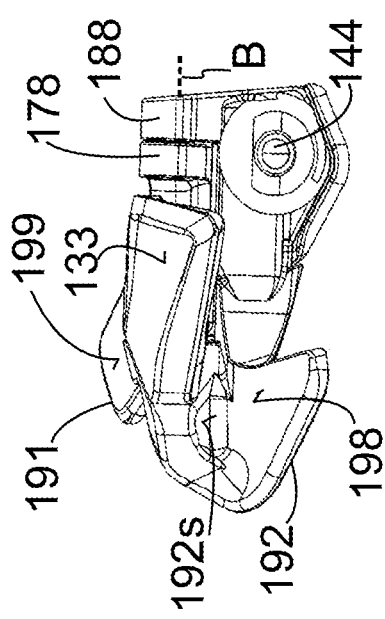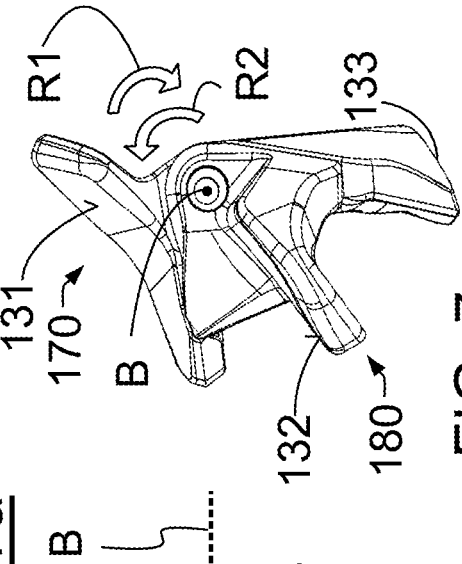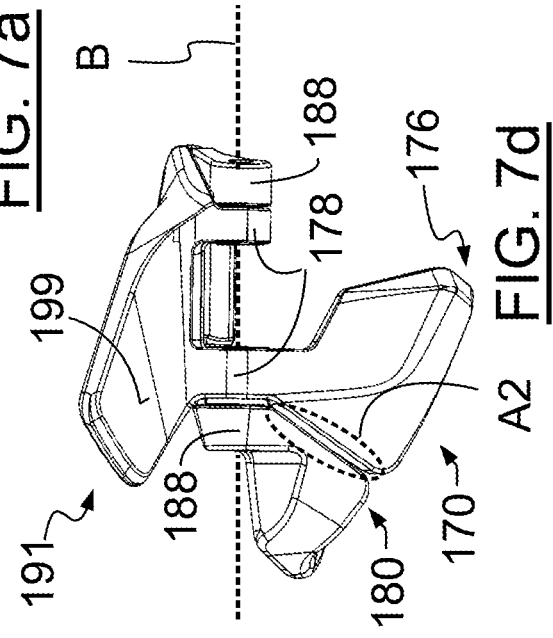

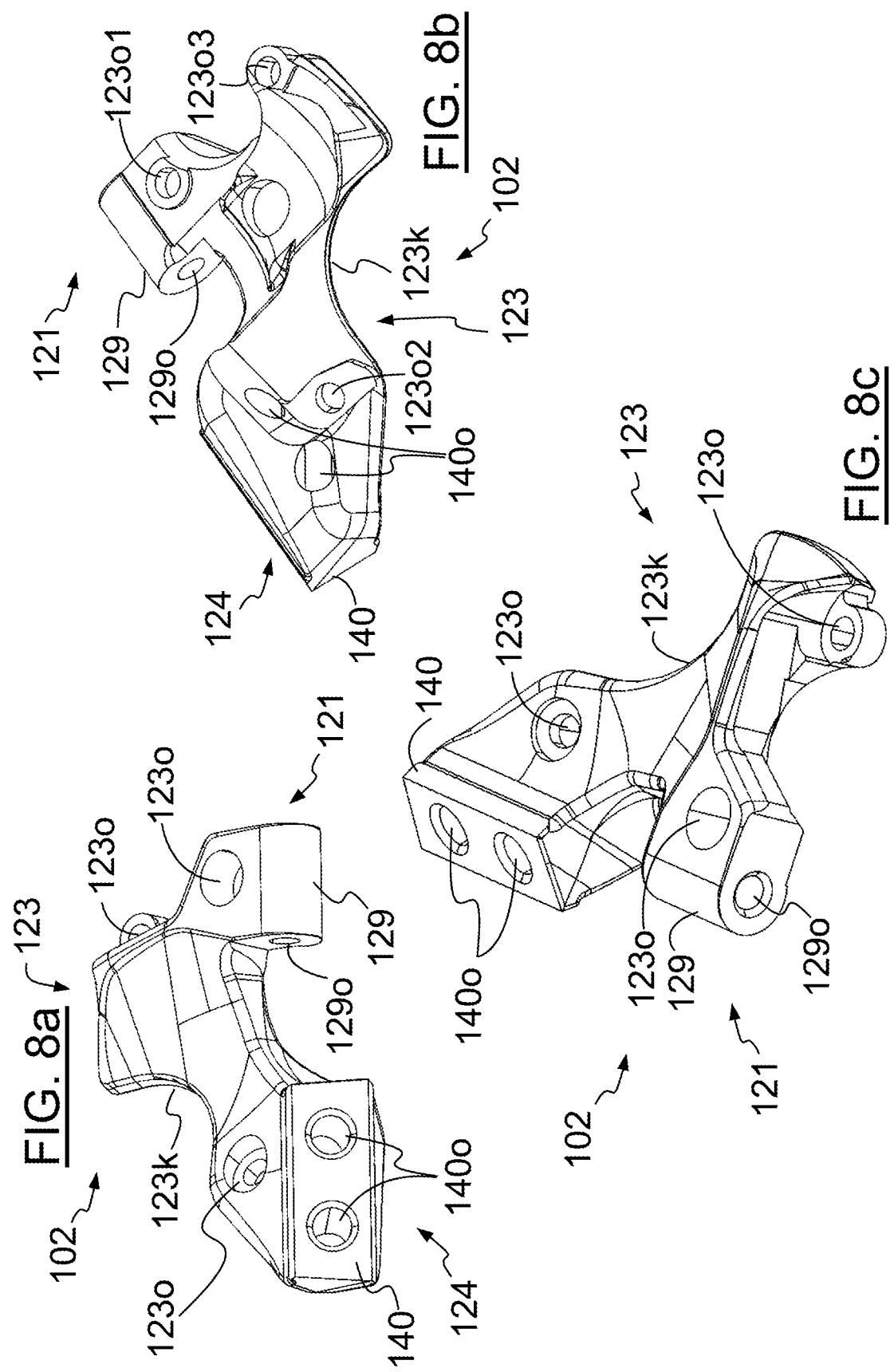

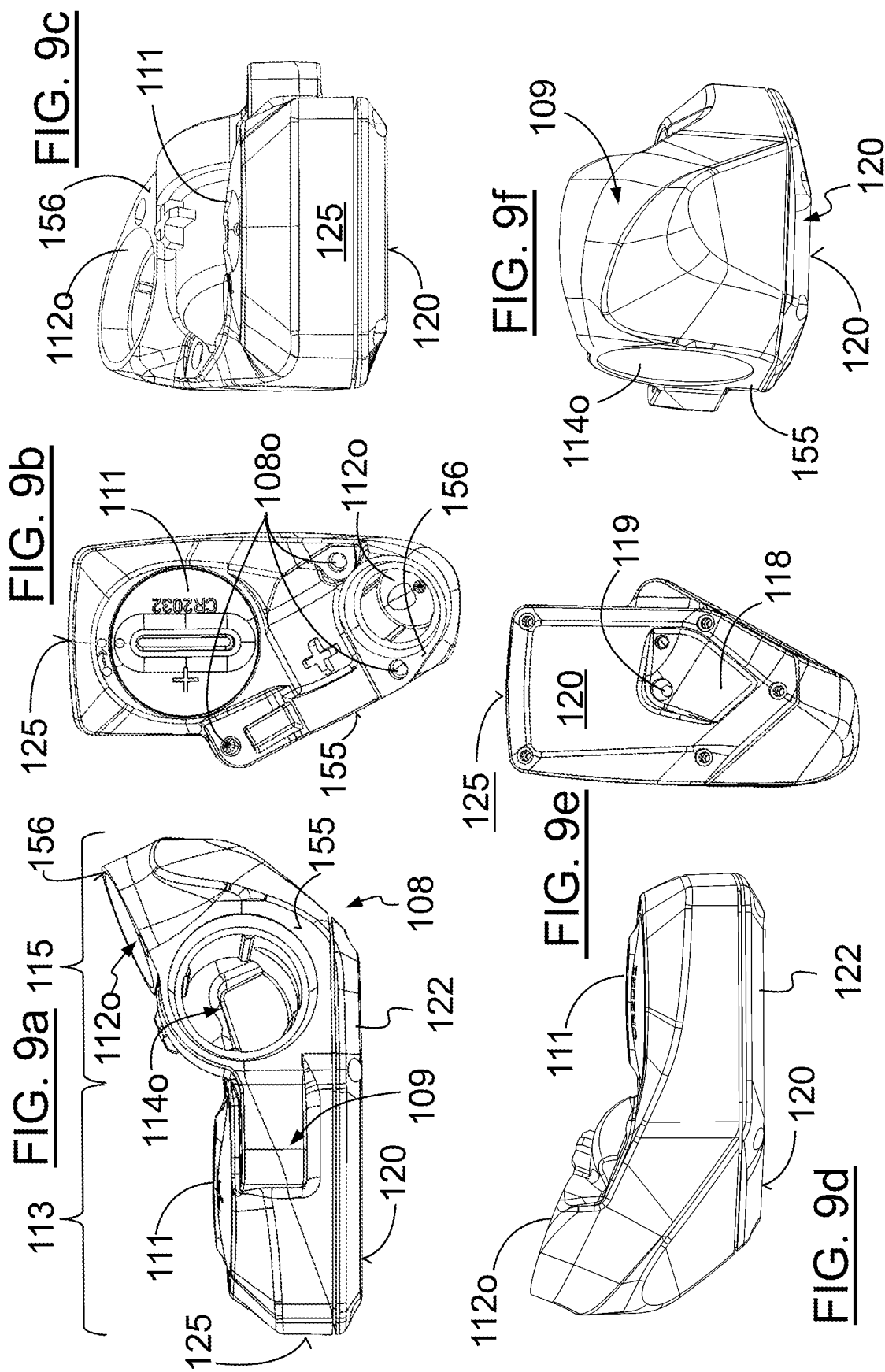

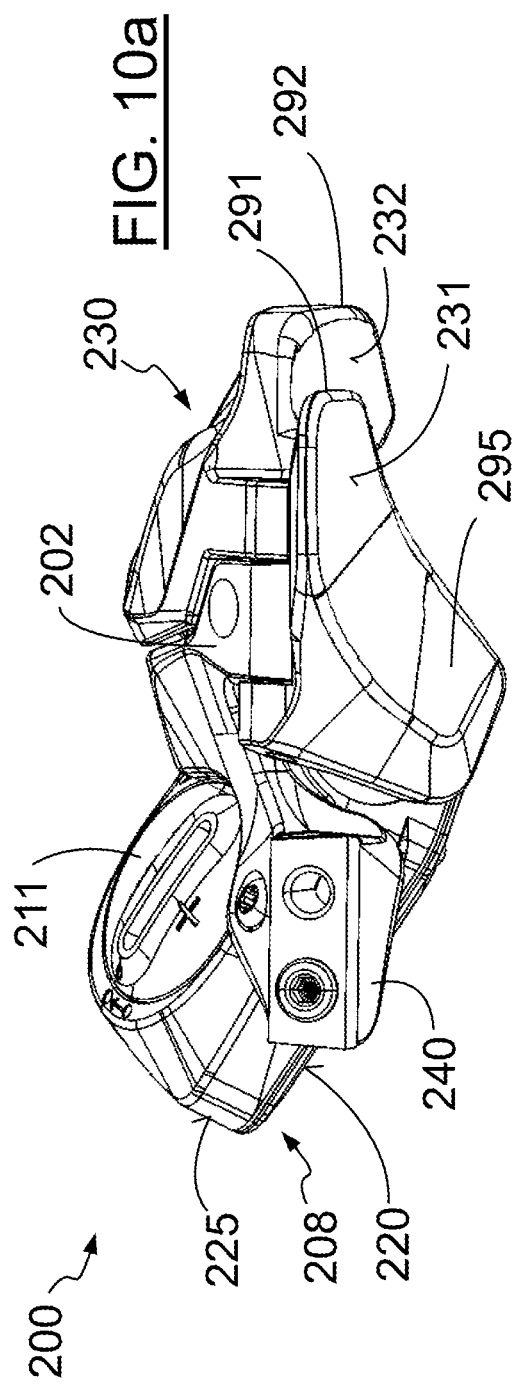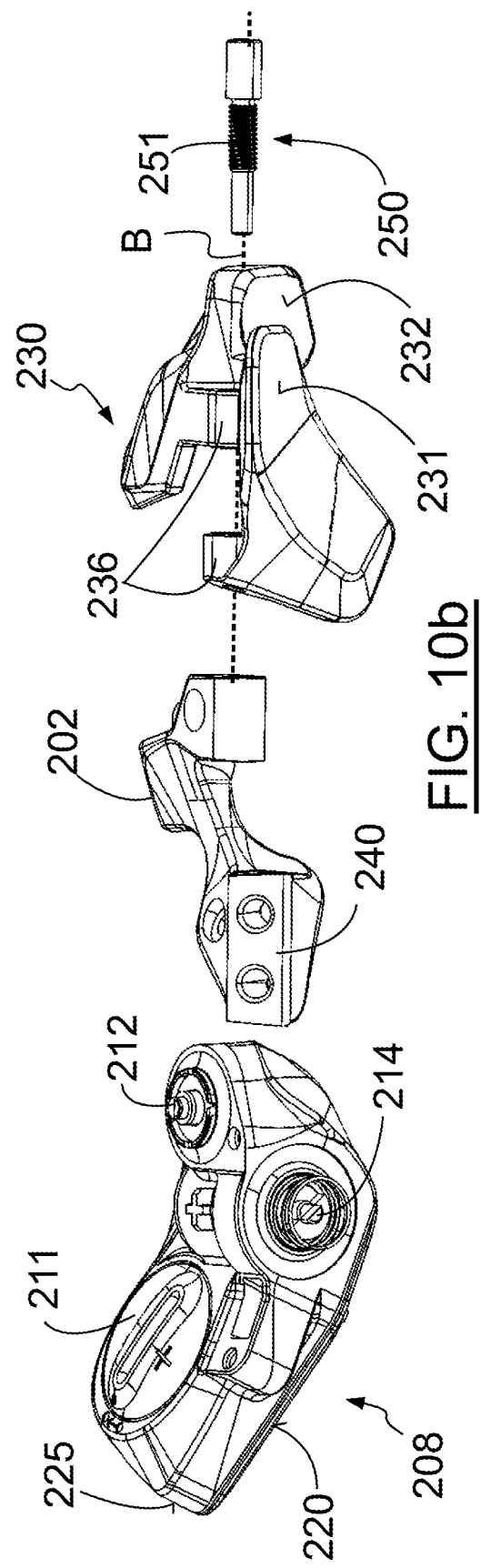

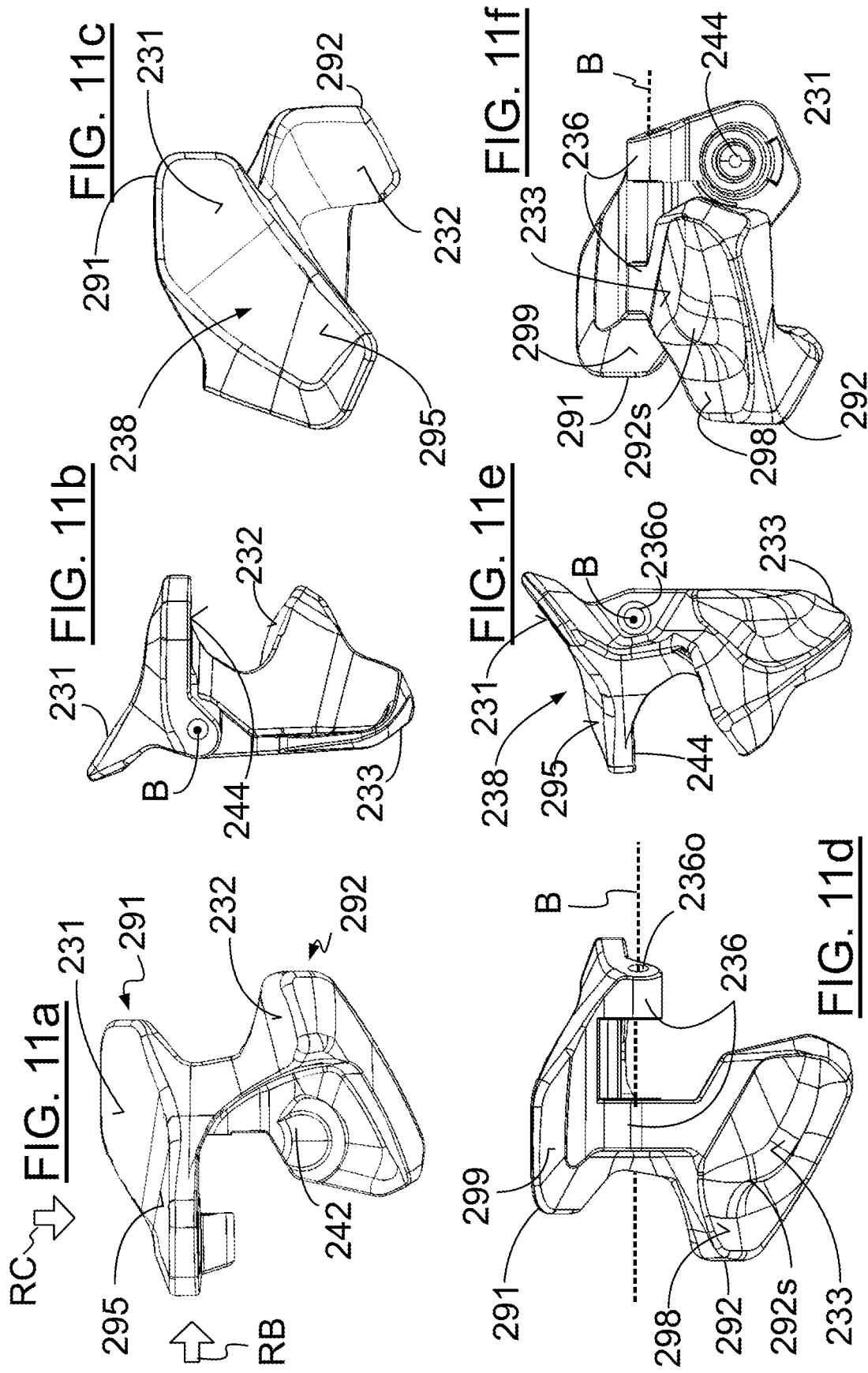

BICYCLE OPERATING APPARATUS

PRIORITY

This application claims priority to, and/or the benefit of U.S. patent application Ser. No. 16/870,489, filed May 8, 2020, which claims priority to German patent application DE 10 2019 206 835.9, filed on May 10, 2019, the contents of which are included by reference herein in their entirety.

BACKGROUND

A generic bicycle operating apparatus is known for example from the document EP 3147194 A1 and illustrated in FIGS. 24 to 26 therein, where the operating component of this known bicycle operating apparatus is an integrally formed plastics component.

SUMMARY

According to one aspect, a bicycle operating apparatus for controlling at least one component of a bicycle, includes a carrier element on which a fastening device for fixing the bicycle operating apparatus to the handlebar of a bicycle is attachable; a housing provided on the carrier element, having an electronic circuit arrangement accommodated in the housing, where a first and a second switch are each connected to the electronic circuit arrangement, and are provided on the housing; and an operating component mounted on the carrier element to be pivotable about an operating axis and preloaded into a neutral position, the operating component deflected out of the neutral position in a first direction of rotation about the operating axis to actuate the first switch, and deflected out of the neutral position in a second direction of rotation opposite to the first direction of rotation to actuate the second switch, where the operating component includes a first operating element and a second operating element formed separately from one another in each case in one piece and are each mounted on the carrier element pivotably about the operating axis.

BRIEF DESCRIPTION OF DRAWINGS

FIG. 4a shows a view obliquely from below of the subject matter in FIG. 2 without the housing;

FIG. 4b shows a perspective view of a part of the housing of the bicycle operating apparatus from FIG. 2 without the cover of the energy storage compartment and without the energy storage element;

FIG. 4c shows a perspective and enlarged view of a contact spring inserted in the bicycle operating apparatus from FIG. 2;

FIGS. 5a-5f show different perspective views of the first operating element of the bicycle operating apparatus from FIG. 2;

FIGS. 6a-6f show perspective views of the second operating element of the bicycle operating apparatus from FIG. 2;

FIGS. 7a-7f show perspective views of the operating component of the bicycle operating apparatus from FIG. 2;

FIGS. 8a-8c show different perspective views of the carrier element of the bicycle operating apparatus from FIG. 2;

FIGS. 9a-9f show different perspective views of the housing of the bicycle operating apparatus from FIG. 2;

FIG. 10a shows a perspective view of a bicycle operating apparatus according to a second exemplary embodiment;

FIG. 10b shows an exploded illustration of the subject matter in FIG. 10a; and

FIGS. 11a-11f show different perspective views of the operating component of the exemplary embodiment from FIGS. 10a and 10b.

Other aspects and advantages of the embodiments disclosed herein will become apparent upon consideration of the following detailed description, where similar or identical structures have similar reference numerals.

DETAILED DESCRIPTION

Figure 1:
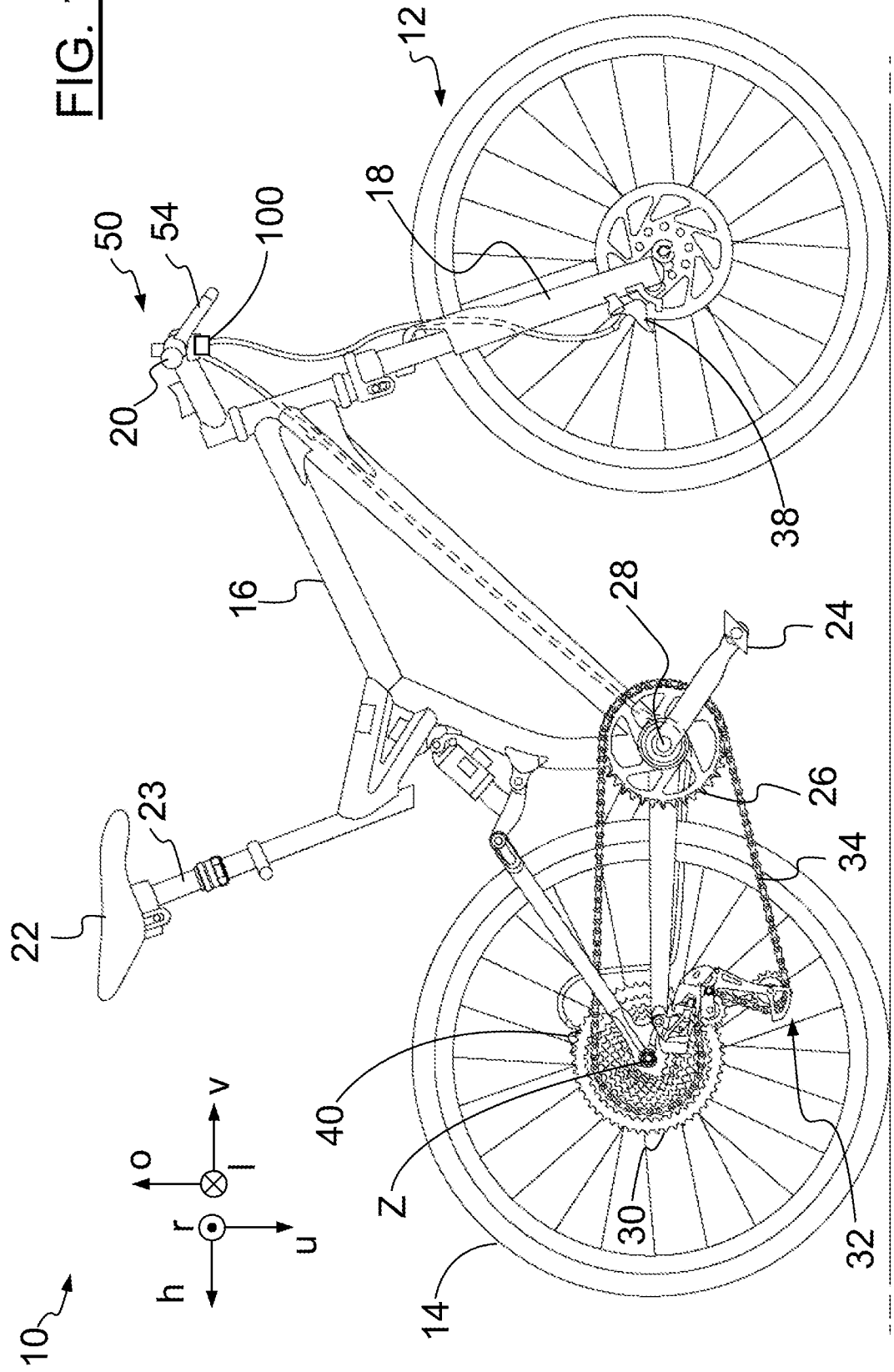
FIG. 1 shows a side view of a bicycle having a bicycle operating apparatus according to a first exemplary embodiment of the present disclosure.

The present disclosure relates to a bicycle operating apparatus for wirelessly controlling a component of a bicycle including a carrier element, a housing and an operating component. A fastening device, such as a clamp, for fixing the bicycle operating apparatus to the handlebar of a bicycle is attachable to or provided on the carrier element. Furthermore, the housing is provided on the carrier element, an electronic circuit arrangement is accommodated in the housing, and a first and a second switch, which are each connected to the electronic circuit arrangement, are provided on the housing. The operating component, which is mounted on the carrier element to be pivotable about an operating axis and is preloaded into a neutral position, is able to be deflected out of the neutral position in a first direction of rotation about the operating axis in order to actuate the first switch, and is able to be deflected out of the neutral position in a second direction of rotation opposite to the first direction of rotation in order to actuate the second switch.

Various embodiments will be described herein with reference to the drawings. It will be understood that the drawings and the description set out herein are provided for illustration only and do not limit the disclosure as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

Against this background, the object, according to a first aspect of the present disclosure, is to increase the design freedom for the operating component compared with the generic bicycle operating apparatus.

To this end, the disclosure proposes that the operating component include a first operating element and a second operating element, which are formed separately from one another in each case in one piece and are each mounted on the carrier element to be pivotable about the operating axis. On account of the better demouldability of the individual parts, greater design freedom can be achieved as a result.

In principle, this is not intended to rule out the possibility of the operating component moving only as a unit from the neutral position for example as a result of a suitable form-fitting engagement between the operating elements.

According to an embodiment, however, it is possible for the two operating elements to be configured and mounted to result in the following kinematics, in each case starting from the neutral position of the operating component:

Direct deflection of the first operating element in the second direction of rotation causes the second operating element to be entrained in the second direction of rotation.

Direct deflection of the second operating element in the first direction of rotation causes the first operating element to be entrained in the first direction of rotation.

Upon direct deflection of the first operating element in the first direction of rotation, the second operating element is not entrained in the first direction of rotation.

Upon direct deflection of the second operating element in the second direction of rotation, the first operating element is not entrained in the second direction of rotation.

Each of the two operating elements is able to be directly deflected separately in one direction of rotation, while direct deflection of the operating element in the respectively other direction of rotation causes the entire operating component to be deflected as a unit.

Direct deflection of an operating element is understood here to mean deflection by direct action by the operator on the particular operating element, in contrast to indirect deflection caused by direct action on the respectively other operating element and interaction of the operating elements with one another.

This makes it possible to increase the number of operating options, specifically when the two operating elements are also configured and mounted such that, starting from the neutral position of the operating component, the first operating element is able to be (directly) deflected in the first direction of rotation and at the same time the second operating element is able to be (directly) deflected in the second direction of rotation in order to actuate both the first switch and the second switch.

The circuit arrangement may be configured such that, upon actuation of the first switch without actuation of the second switch, it generates a first signal, upon actuation of the second switch without actuation of the first switch, it generates a second signal, and upon simultaneous actuation of the first and second switches, it generates a third signal. In this way, three functions and/or components of the bicycle can be controlled with two operating elements. By using such a bicycle operating apparatus on both sides of the handlebar, it is possible to control six functions or components. It is possible, for example using a suitable app, to assign the individual switches or switch actuations to the desired functions or components to be controlled by the switch actuations.

For example, the first signal can be used to initiate shifting up of a rear derailleur by one gear stage, the second signal can be used to initiate shifting down of the rear derailleur by one gear stage, and the third signal can be used to control for example adjustment of the seat post.

Generally, in the present application, the term "switch" denotes any kind of switching element, in particular switches proper, which open and close a circuit, buttons, which trigger a pulse in order to activate a circuit or process, and push switches, which are activated by being actuated and deactivated when released. The switches are configured as push buttons or snap-action switches.

In structural terms, the above-described coupling of the two operating elements can be realized easily in that the first operating element and the second operating element each have a contact surface. In this case, the contact surfaces of the first and the second operating element each extend substantially radially away from the operating axis or parallel thereto, and the contact surfaces face one another in the fitted state of the bicycle operating apparatus.

The fact that a surface extends radially away from an axis should be understood as meaning that the surface extends in a plane that contains this axis.

In a neutral position of the operating component, the contact surfaces of the first and the second operating element can bear directly or indirectly on one another in order to achieve the above-described deflection behavior.

In order, upon direct deflection of the first operating element in the first direction of rotation or direct deflection of the second operating element in the second direction of rotation, to prevent the respectively other operating element from being moved in an undesired manner, for example wobbling, it is possible for the bicycle operating apparatus to have a compression spring, one end of which is supported on the contact surface of the first operating element and the other end of which is supported on the contact surface of the second operating element. In this case, the contact surfaces are indirectly in contact with one another via the compression spring.

In a space-saving and expedient configuration of the operating component, it is possible for one of the operating elements, for example the second operating element, to comprise a plate-like wing portion, which extends substantially radially away from the operating axis or parallel thereto. In this case, the contact surface of the second operating element is formed on a first side of the plate-like wing portion and a switch actuating surface for actuating the second switch is formed on a second side, opposite to the first side, of the plate-like wing portion.

According to an embodiment, it is possible for the other, i.e. for example the first, operating element to comprise a first plate-like wing portion and a second plate-like wing portion, which each extend substantially radially away from the operating axis or parallel thereto, where the contact surface of the first operating element is formed on one side of the first wing portion and a switch actuating surface for actuating the first switch is formed on a side of the second wing portion that faces this contact surface.

The contact surface and the switch actuating surface of the first operating element can in this case be arranged at an angle of 80 to 100 degrees, particularly at an angle of about 90 degrees, to one another.

Where surfaces or surface portions are said to be arranged parallel or perpendicular or at a given angle to one another in this application, this should be understood as meaning that the surfaces or surface portions are each flat or at least approximately flat, i.e. extend in or along an associated plane, and that the planes associated with the surfaces or surface portions are parallel to one another or perpendicular to one another or intersect one another at the given angle.

In order to increase the operating comfort and operating safety, according to an embodiment, in the neutral position of the operating component, surfaces of the first and the second operating component that are visible from the outside and adjoin one another transition steplessly into one another at least locally. As a result, the risk of one of the operator's fingers being trapped or caught at and between the operating elements is reduced, and the two operating elements together also visually create the impression of a unitary operating component.

According to an embodiment, the operating component may comprise three separate thumb engagement surfaces, i.e. a first, a second and a third thumb engagement surface. These are each designed for actuation by a thumb of an operator for actuation of one of the switches, such that the first switch is actuable by actuation of the first thumb engagement surface and the second switch is actuable by actuation of the second thumb engagement surface. Furthermore, the second switch is likewise actuable by actuating the third thumb engagement surface.

According to a second aspect of the disclosure, protection is also requested for a generic bicycle operating apparatus in which the operating component comprises three thumb engagement surfaces as described above.

Independently of whether the operating component is constructed in one piece or in a multipart manner, this can result in multifarious operating possibilities for the operator's thumb.

The first and the second thumb engagement surface are arranged at an angle of less than 30° to one another, such that the two switches are actuated ergonomically with a similar thumb movement in particular in virtually the same direction (forwards) and with similar force application.

Furthermore, the first and the second thumb engagement surface can be arranged in an offset manner relative to one another both along the operating axis and in a direction perpendicular to the operating axis, in order to adapt the position of the thumb engagement surface to the movement possibilities of the thumb of a hand that is holding a handlebar grip with the other fingers.

Alternatively or additionally, it is possible for at least one, preferably each of the first and the second thumb engagement surface to be formed at least locally on a radially and/or axially protruding operating protrusion that is formed in a plate-like manner. The rear surface of at least one, preferably both operating protrusions can in this case be configured as an engagement surface for one of the other fingers of the operator's hand.

In the case of an operating component constructed in a multipart manner, having a first and a second operating element, the first thumb engagement surface is formed on the first operating element and the second thumb engagement surface is formed on the second operating element.

The third thumb engagement surface can adjoin or transition into the first thumb engagement surface such that the second switch is actuable by actuating the third thumb engagement surface with the operator's thumb.

In this case, the first and the third thumb engagement surface jointly form a recess-like structure for the operator's thumb. This recess-like structure is formed in a relatively shallow manner, in order that the third thumb engagement surface does not get in the way of a movement of the thumb from the first thumb engagement surface to the second. For example, the first thumb engagement surface can adjoin the third thumb engagement surface at an angle of more than 140 degrees, preferably at an angle of about 150 degrees.

It is noted that the figures are simplified and schematic illustrations that are intended to illustrate mainly the principle of the present disclosure. In order not to clutter the figures, reference signs are not always provided for all the features in each illustration, but rather primarily only for those features that are required for explaining the particular figure.

Unless explicitly stated otherwise, directional terms such as front, rear, top, bottom, left and right relate, in the present application, to the directions indicated in FIG. 1 by arrows v, h, o, u, l and r, as arise for a rider who is sitting in a normal manner on a bicycle that is equipped with the bicycle operating apparatus and is standing or travelling on a horizontal underlying surface.

A bicycle denoted 10 overall in FIG. 1 has, in a known manner, a front wheel 12, a rear wheel 14 and a frame 16. The front wheel 12 is mounted in a rotatable manner at bottom ends of a front-wheel fork 18, which is held on the frame 16 in a rotatable manner at its upper end and carries a handlebar 20 for steering the bicycle 10. The rear wheel 14 is mounted in a rotatable manner at a rear end of the frame 16.

The frame 16 also carries a seat 22 and a crank assembly with pedal cranks 24 and a front chain wheel 26 fastened thereto. The crank assembly is fitted on the frame to be rotatable about a pedal-crank bearing axle 28. Fitted on the rear wheel 14, concentrically with the wheel axis Z, is a pinion assembly 30 that carries a plurality of pinions of different diameters, i.e. with different numbers of teeth. In the exemplary embodiment, a pinion assembly with a total of twelve pinions is provided, and the front chain wheel 26 is provided as a single wheel, such that a total of twelve shift stages are settable. Within the scope of the disclosure, other shift configurations may be used, including multiple chain wheels, between which it is possible to shift a front derailleur.

In order to set the shift stages of the rear pinion assembly 30, use is made of a rear derailleur system having a rear derailleur 32, which is likewise fastened to a rear end of the frame 16 and forms part of an actuating device. A chain 34 runs around the pinion assembly 30 and the front chain wheel 26 and passes through the rear derailleur 32 in order to transmit driving force from the front chain wheel 26 to the pinion assembly 30 and thus to the rear wheel 14. The rear derailleur 32 is in this case capable of adjusting the chain 34 in an axial direction with respect to the axis of rotation Z of the rear wheel 14, in order to align the chain 34 selectively with one of the pinions of the pinion assembly 30 and accordingly to guide it onto the selected pinion.

In order for a rider to set the rear derailleur 32 into a desired shift stage, a bicycle operating apparatus 100 according to a first exemplary embodiment is provided on the handlebar 20 on the right-hand side from the rider's point of view. In this case, the bicycle operating apparatus 100 transmits operating commands for controlling the rear derailleur 32 wirelessly via a radio connection between a radio transmitter integrated in the bicycle operating apparatus 100 and a radio receiver integrated in the rear derailleur 32.

Alternatively, however, other variants are conceivable and usable in the scope of the present disclosure in order to transmit operating commands by the rider from the bicycle operating apparatus 100 to a component of the bicycle, for example in order to set a suspension fork 18, damping or the height of a seat post 23.

In addition, the bicycle comprises a brake system, for example in the form of a front disc brake 38 and/or a rear disc brake 40. For operating the brake system, at least one brake operating device 50 having a manual brake lever 54 is provided.

Figure 2:
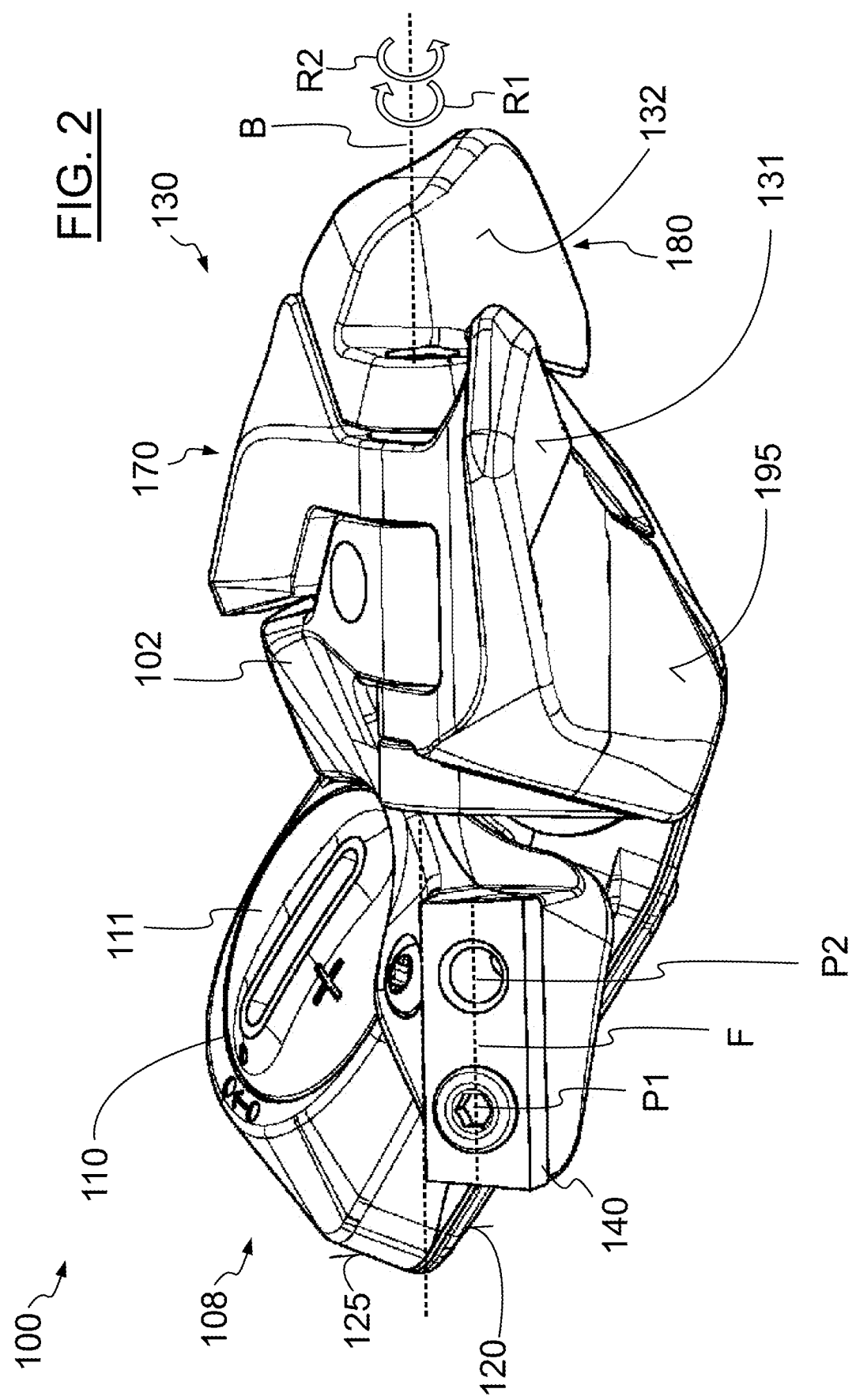
FIG. 2 shows an enlarged perspective illustration of the first exemplary embodiment from FIG. 1 without the handlebar, the brake operating device and the fastening device.

FIG. 2 shows the bicycle operating apparatus 100 in a perspective illustration without the handlebar, the brake operating device and the fastening device, approximately at the viewing angle at which it is also seen by the rider (the operator) sitting on the bicycle.

As FIG. 2 shows, the bicycle operating apparatus 100 comprises a carrier element 102, on which a fastening device (not illustrated here), for example a conventional clamp, can be provided so as to be adjustable in different fastening positions P1, P2 in a linear manner along a guiding line F on a linear guide 140, in order to attach the bicycle operating apparatus 100 to the handlebar 20 of the bicycle 10. In this case, the clamping axis coincides, in the state fitted on the handlebar, substantially with the handlebar axis.

Furthermore, a housing 108 is fastened to the carrier element 102, the housing 108 accommodating an energy storage element 101 (not illustrated in FIG. 2) in the form of a button cell in an energy storage compartment 110 that is closed by a cover 111 and accommodating an electronic circuit arrangement 103 that is likewise not visible here.

Figure 3:
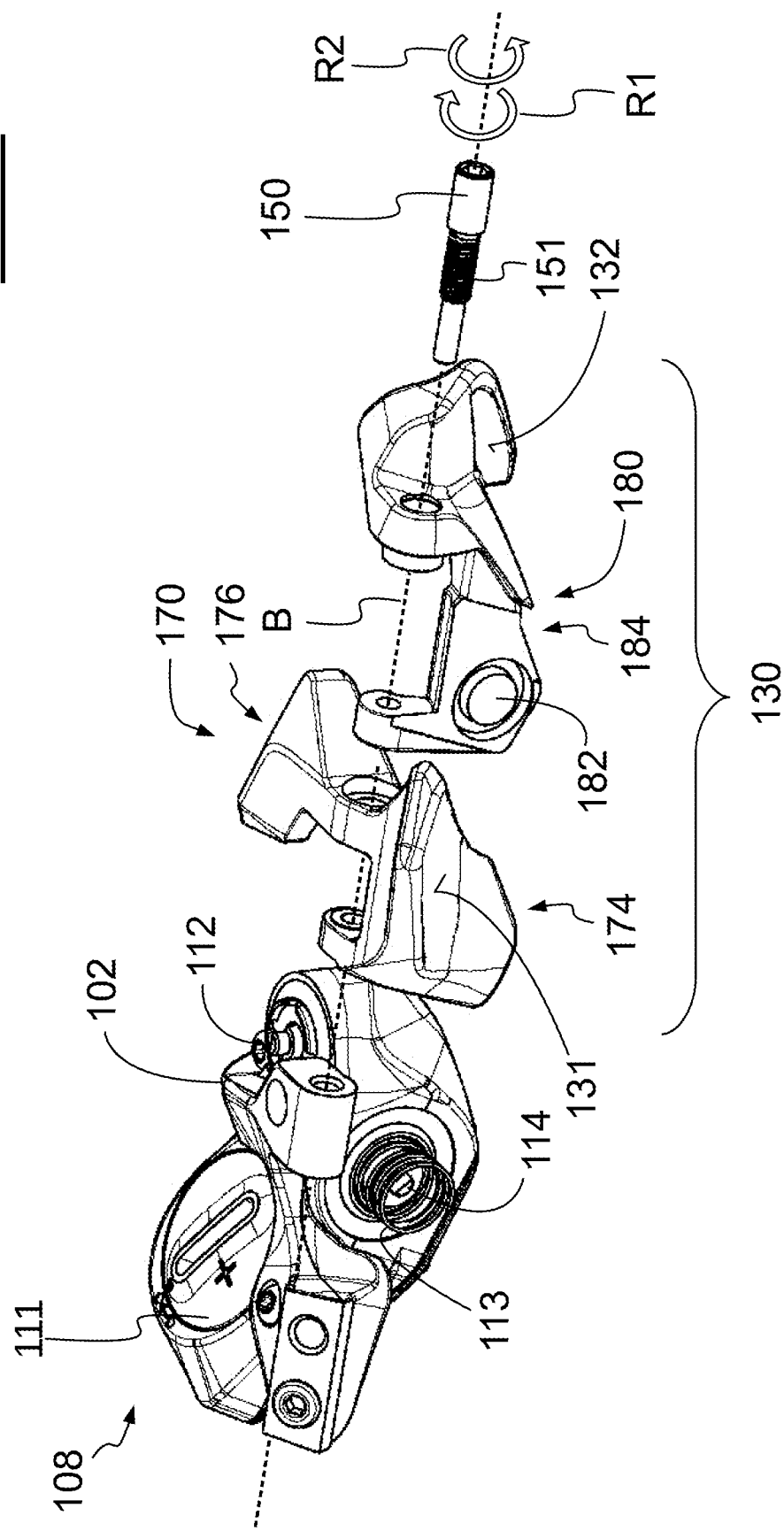
FIG. 3 shows an exploded illustration of the subject matter in FIG. 2.

Also provided on the housing 108 are two switches 112 and 114, which are connected to the electronic circuit arrangement, can be seen better in particular in FIG. 3, and which may be for example push buttons or snap-action switches.

Finally, an operating component 130 is mounted on the carrier element 102 to be pivotable about an operating axis B and is preloaded into the neutral position illustrated in FIG. 3. From this neutral position, the operating component 130 is able to be deflected about the operating axis B in a first direction of rotation R1 in order to actuate the first switch 112, and the operating component is able to be deflected out of the neutral position about the operating axis B in a second direction of rotation R2, which is opposite to the first direction of rotation R1, in order to actuate the second switch 114. The operating axis B extends, in the fitted state of the bicycle operating apparatus 100, substantially parallel to the handlebar axis.

In the present case, the operating component 130 is constructed in a multipart manner and comprises a first operating element 170 and a second operating element 180, which are each formed in one piece and are mounted on the carrier component 102 so as to be pivotable about the operating axis B. The operating elements 170 and 180 are each produced from plastic.

The form of the individual components can be seen better in the exploded illustration in FIG. 3, where the individual constituents are each illustrated in a manner offset from one another along the operating axis B.

FIG. 4a shows parts of the subject matter of FIG. 2 in a view obliquely from below, although the housing is not illustrated, in order to make it possible to see the electronic circuit arrangement 103 and the energy storage element 101 in the form of a button cell.

The electronic circuit arrangement 103, illustrated in a schematic and simplified manner, is connected to the switches 112, 114, or switch modules 112*m*, 114*m* via lines 107 that are only indicated here, and comprises electronics for generating a signal on the basis of the position and/or actuation of the switches 112 and 114, and a radio antenna (not illustrated here) in order to transmit the generated signals to the component of the bicycle 10 that is to be controlled in each case.

The circuit arrangement 103 is connected to the button cell, as energy storage element 101, via contact springs 193 and 194 that are at least partially visible in FIG. 4b.

The contact spring 193 that is illustrated in an enlarged and perspective manner in FIG. 4c is formed integrally from metal and comprises a first spring leg 193a, which is oriented parallel to the flat outer surfaces of the button cell in the installed state, and a second spring leg 193b, which bears regionally against the side of the button cell in the installed state. A bend 193c through somewhat more than 90° in the unloaded state connects the spring legs 193a and 193b.

In the installed state, a tongue 193d butts against a contact surface of the housing 108 and thus helps to orient the contact spring 193 in the housing 108. Furthermore, it can be used in the functional test of the circuit board, where a spring contact pin is placed thereon for testing.

Two through-openings 193o formed in the first spring leg 193a serve to fasten the contact spring 193 in the housing 108. For this purpose, two pegs (not illustrated here) engage through the through-openings 193o and are fused in order to create a form-fitting engagement.

Finally, a soldering pin 193e of the contact spring 193, the soldering pin 193e protruding from the first spring leg 193a approximately perpendicularly in the opposite direction to the second spring leg 193b, serves to establish a connection to the electronic circuit arrangement 103.

In order to explain the construction and function of the operating component 130 in more detail, only the first operating element 170 is illustrated in FIGS. 5a-5f, only the second operating element 180 is illustrated in FIGS. 6a-6f, and the entire operating component 130 is illustrated in FIGS. 7a-7f, in each case, in different perspective views.

The viewing angles of mutually corresponding FIGS. 5a to 7f are in each case identical, or, in other words, FIGS. 5a-5f are apparent from FIGS. 7a-7f by removing the second operating component and FIGS. 6a-6f are apparent from FIGS. 7a-7f by removing the first operating component.

The subfigures a and d, b and e, and c and f, which are illustrated in each case one above the other, illustrate the illustrated subject matter in each case from opposite viewing directions, and subfigures b and c illustrate the subject matter of subfigure a in each case from the direction that is indicated by an arrow RB or RC, respectively, in subfigure a.

The relative position of the two operating elements 170, 180 to one another in FIGS. 7a-7f corresponds to their relative position in the neutral position of the operating component 130.

The first operating element 170, illustrated separately in FIGS. 5a-5f, comprises a first plate-like wing portion 174 and a second plate-like wing portion 176, where the first plate-like wing portion 174 extends away from the operating axis B, substantially parallel thereto, while the second plate-like wing portion 174 extends substantially radially away from the operating axis B, as is clear in particular from FIG. 5b.

Formed on that side of the first plate-like wing portion 174 that faces the housing 108 in the fitted state is a contact surface 172 of the first operating element 170, the contact surface 172 serving, upon direct deflection of the first operating element 170 about the operating axis B in the second direction of rotation R2 (clockwise in FIG. 5b) of FIGS. 5a to 7f, to enter into interaction with the contact surface 182 of the second operating element 180 and thus to entrain the second operating element 180 in the second direction of rotation R2, such that the operating component 130 moves as a unit.

Formed on that side of the second plate-like wing portion 176 that faces the housing 108 in the fitted state is a switch actuating surface 142 of the first operating element 170, the switch actuating surface 142 serving to actuate the first switch 112 upon deflection of the first operating element 170 out of the neutral position in the first direction of rotation R1.

The contact surface 172 and the switch actuating surface 142 of the first operating element 170 are oriented at an angle of 80° to 100° to one another, preferably at an angle of about 90° (cf. FIGS. 6b and 6e).

Furthermore, an operating protrusion 191 protrudes from the first plate-like wing portion 174 of the first operating element 170 radially and axially outwardly with respect to the operating axis B, where a first thumb engagement surface 131 is formed on that side of the operating protrusion 191 that faces the rider in the fitted state, and an engagement surface 199 for one of the other fingers is formed on the rear side.

Provided on that side of the second plate-like wing portion 176 that faces away from the housing 108 in the fitted state is a finger operating surface 133 that is convexly curved perpendicularly to the operating axis B and can be operated in both directions of rotation R1 and R2 for example by the rider's index finger bend, while the rest of the fingers grasp the handlebar grip.

Provided on that side of the first plate-like wing portion 174 that faces away from the housing 108 in the fitted state is a third thumb engagement surface 195, which is flat in first approximation, transitions into the first thumb engagement surface 131 and jointly forms with the latter a shallow, recess-like structure 138 for the operator's thumb.

For fitting on the carrier element 102, two bearing portions 178 that are spaced apart axially from one another and having aligned through-openings 178o are provided, one of which is provided in a connecting region between the first plate-like wing portion 174 and the second plate-like wing portion 176, and the other of which is provided in a peripheral region of the second plate-like wing portion 176.

The second operating element 180, which is illustrated separately in FIGS. 6a-6f, comprises a plate-like wing portion 184, which extends substantially radially away from the operating axis B (cf. FIG. 6b).

The contact surface 182 of the second operating element 180 is formed on that side of the plate-like wing portion 184 that faces the contact surface 172 of the first operating element 170 in the fitted state, and a switch actuating surface 144 for actuating the second switch 114 is provided on the opposite side.

Furthermore, an operating protrusion 192 protrudes from the plate-like wing portion 184 of the second operating element 180 radially and axially outwardly with respect to the operating axis B, where a second thumb engagement surface 132 is formed on that side of the operating protrusion 192 that faces the rider in the fitted state, and an engagement surface 198 for one of the other fingers is formed on the rear side facing away from the rider. Furthermore, a step 192s (cf. FIG. 6f) is formed on the rear side, facing away from the rider, of the operating protrusion 192, the step 192s being able to be gripped for example by the index finger and to be actuated by a pulling movement.

For fitting on the carrier element 102, two bearing portions 188 that are spaced apart axially from one another and have aligned through-openings 188o are provided. The axial spacing of the bearing portions 188 is in this case selected such that, in the fitted state, the bearing portions 178 of the first operating element 170 are arranged between the bearing portions 188 of the second operating element 180 (cf. FIG. 7d).

In order to preassemble the two operating elements 170, 180 to form the operating component 130, it is possible for a hollow-cylindrical protrusion 189 to be provided for example on the inner side of one of the bearing portions 188 of the second operating element 180, the protrusion 189 fitting into the through-opening 178o in the immediately adjacent bearing portion 178 of the first operating element 180.

As illustrated in FIGS. 7c and 7d, the operating elements are configured such that, in the neutral position of the operating component 130, surfaces of the first and the second operating element 170 and 180 that are visible from the outside and adjoin one another transition steplessly into one another at least in the portions A1 and A2.

In addition to an attractive, uniform appearance of the operating component 130, the risk of one of the operator's fingers being caught or trapped in a gap or step between the operating elements is reduced thereby.

For the same purpose, in the neutral position of the operating component 130, a peripheral edge of the plate-like wing portion 184 of the second operating element 180 is at least partially overlapped by an overhanging edge 174r of the first plate-like wing portion 174 of the first operating element 170 (cf. FIGS. 7a and 7b).

It should be added that a spring plate 172t, 182t can be provided at each of the contact surfaces 172, 182 of the first and the second operating element 170, 180, for supporting the ends of a compression spring (not illustrated) that is arranged between the contact surfaces 172, 182 in the fitted state and is intended to prevent undesired movements of the in each case other operating element when the first operating element 170 is deflected out of the neutral position in the first direction of rotation R1 or the second operating element 180 is deflected out of the neutral position in the second direction of rotation R2, in each case separately.

The two-part form of the operating component 130 and the separate deflectability of the first operating element 170 in the first direction of rotation R1 and of the second operating element 180 in the second direction of rotation R2 makes it possible in particular to control an additional function or component of the bicycle, in that, for example by simultaneous pressure actuation of the second thumb engagement surface 132 and the finger engagement surface 133, the first operating element 170 is deflected in the first direction of rotation R1 and in the process the second operating element 180 is deflected in the second direction of rotation such that both switches 112, 114 are actuated simultaneously.

At selected individual engagement surfaces or a plurality thereof, it is possible (in contrast to what is illustrated) for surface structuring or a relief-like pattern to be provided in each case, in order to reduce the risk of the operator's particular finger slipping.

On account of the modular design of the bicycle operating apparatus, it is conceivable to provide the operating component 130 in an exchangeable manner on the carrier element 102, such that the operating component can be adapted ergonomically and/or haptically to the rider's wishes. The (screw) connection provided in the present case between the carrier element 102 and operating component 130 with the pivot pin 150 allows quick and easy fitting. It is possible to provide a kit for a bicycle operating apparatus according to the disclosure having a plurality of exchangeable operating components that differ in terms of shape and/or surface.

The carrier element 102 illustrated in FIGS. 8a-8c from different viewing angles is formed in one piece in the present case, preferably from metal, for example from aluminium.

It has an operating component fastening portion 121, a clamp fastening portion 124 and a housing fastening portion 123.

A linear guide 140 can be provided on the clamp fastening portion 124. The linear guide is configured in the form of an elongate rail with two fastening openings 140o, which define the two fastening positions P1 and P2 for fastening a fastening device to the carrier element 102.

The operating component fastening portion 121 of the carrier element 102 comprises for example a bearing protrusion 129 with a through-opening 129o, into which the pivot pin 150 is inserted, and which defines the position of the operating axis B on the carrier element 102. The through-opening 129o has pan internal thread, into which an external threaded portion 151 of the pivot pin 150 (cf. FIG. 3) can be screwed.

In the housing fastening portion 123, three fastening openings 123o are provided, at which the carrier element 102 can be fixed to the housing 108 by way of appropriate fastening elements.

In order to achieve stable fastening, taking into account the forces that act on the apparatus when the switches are actuated, of the three fastening openings 123o a first one 123o1 is located in the vicinity of the operating component fastening portion 121, a second one 123o2 is located in the vicinity of the clamp fastening portion 124, and a third one 123o3 is located at a distance from the connecting straight line through the first and the second fastening opening 123o1, 123o2 (cf. FIG. 7b).

In order to ensure stable fastening of the housing 108 with easy access to the energy storage compartment 110, the housing fastening portion 123 also has, in the region in which it adjoins the energy storage compartment 110 in the fitted state, an edge 123k that follows the (circular) contour of the cover 11 of the energy storage compartment.

The housing 108 illustrated in different perspective views in FIGS. 9a-9f is formed in a multipart manner with a housing body 109 and a removable lower housing cover 122, where the housing cover 122 has a lower flat outer surface 120 in the present case.

The housing 108 comprises an electronics portion 113 and a switch portion 115 (cf. FIG. 9a).

In the electronics portion 113, having the basic shape of a flat cuboid, the energy storage element 101 in the form of a button cell is provided in an energy storage compartment 110 and the electronic circuit arrangement 103 is provided beneath the button cell. The outer surfaces of the electronics portion 113, in particular the lower flat outer surface 120 and a lateral flat outer surface 125, are flat in first approximation and all extend obliquely with respect to the operating axis B.

It is possible to access the button cell after removal of an energy storage compartment cover 111 provided on an upper outer surface of the housing 108, and it is possible to access the circuit arrangement after removal of the lower housing cover 122 and possibly a further separating plate.

Furthermore, a switch 119 can be provided on the underside of the lower housing cover 122, preferably in a set-back portion 118, the switch 119 serving for example, when the bicycle operating apparatus is put into operation, to pair the bicycle operating apparatus 100 with the component to be controlled thereby. Alternatively or additionally, some other mode or some other function of the bicycle operating apparatus 100 could be selected with this switch. Upon pairing with a rear derailleur, switching for example between a "coarse adjustment" mode and a "fine adjustment" mode could be effected, where, in the "coarse adjustment" mode, switching between adjacent shift stages is effected by actuating the switches 112, 114, while, in the "fine adjustment" mode, switching between different (tuning) settings of the same shift stage is effected. In principle, the switch 119 is designed to effect pre-setting before the start of a journey.

The switch portion 115 of the housing 108 has round receiving openings 112o and 114o, which serve to receive cylindrical switch modules with the switches 112 and 114, which are not illustrated in FIGS. 9a-9f. Located only in the region of the switch portion 115 in the present exemplary embodiment are outer surface portions 155, 156 of the housing 108 that are not oriented obliquely but approximately parallel to the operating axis B when the housing 108 is fastened to the carrier element 102. In the outer surface portions 155 and 156 that are illustrated in FIGS. 9a and 9b, the receiving openings 112o and 114o, respectively, are provided in this case.

The outer surface portions 155, 156 in the switch portion 115, which are arranged substantially perpendicularly to one another, are each arranged obliquely with respect to the flat lower outer surface 120 and to the lateral outer surface 125 in the electronics portion 113. In this sense, the switch portion 115 is arranged at an angle to the electronics portion 113, thereby favoring a compact construction of the housing 108.

Provided on the top side of the housing 108 are three fastening openings 108o, which serve to fasten the housing 108 to the carrier element 102.

The shape of the housing 108 is designed to take up as little volume as possible and at the same time to allow ergonomically and aerodynamically favorable positioning of the operating component 130 on the handlebar 20.

FIGS. 10a, 10b and 11a-11f illustrate a further exemplary embodiment of a bicycle operating apparatus 200, which is primarily described in more detail only inasmuch as it differs from the first exemplary embodiment. Otherwise, reference is made to the above description of the first exemplary embodiment.

Features of the second exemplary embodiment that correspond to those of the first exemplary embodiment are provided with reference signs that are based on the reference signs of the corresponding features of the first exemplary embodiment increased by 100. Where letters are used as or in reference signs, the same letters are used in each case for corresponding features of both exemplary embodiments.

The second exemplary embodiment of a bicycle operating apparatus 200 differs from the first exemplary embodiment mainly in that the operating component 230 is constructed in one piece.

In order to mount the operating component in a rotatable manner on the carrier element 202, two axially spaced-apart bearing portions 236 with aligned through-openings 236o are provided, through which the pivot pin 250 is inserted and is screwed together with the carrier element 202.

As in particular a comparison of FIGS. 11a-11f and 7a-7f shows, the form of the operating component 230 formed in one piece is otherwise very similar to that of the two-part operating component 130 of the first exemplary embodiment.

In particular, the operating component 230 has a first operating protrusion 291 and a second operating protrusion 292, which protrude radially and axially and are arranged in a manner offset from one another both along the operating axis B and in a direction perpendicular thereto, where a first thumb engagement surface 231 is formed on a front side, facing the rider, of the first operating protrusion 291, a second thumb engagement surface 232 is formed on a front side of the second operating protrusion 292, the surfaces being oriented at an angle of less than 30 degrees to one another (preferably almost parallel to one another) and being arranged such that the first switch is actuable by actuating the first thumb engagement surface 231 and the second switch is actuable by actuating the second thumb engagement surface 232.

Formed on the rear side of the first operating protrusion 291 is an engagement surface 299 for one of the other fingers, and likewise an engagement surface 298 is formed on the rear side of the second operating protrusion 292.

Furthermore, the operating component comprises a finger engagement surface 233 that is convexly curved perpendicularly to the operating axis and can be operated with the index finger bend of one hand, and, at the transition between the engagement surface 289 and the finger engagement surface 233, a step 292s, which can be gripped for example by the index finger.

Finally, the operating component 230 also has a third, at least approximately flat thumb engagement surface 295, which adjoins the first thumb engagement surface 231 and, together with the latter, forms a shallow, recess-like structure 238 for the operator's thumb.

For example, pressing the first thumb engagement surface 231 results in deflection of the operating component 230 in the first direction of rotation R1 for actuating the first switch 212.

Furthermore, pressing the second thumb engagement surface 232 results in deflection of the operating component 230 in the second direction of rotation R2 for actuating the second switch 214.

Likewise, pressing the third thumb engagement surface 295 results in deflection of the operating component 230 in the second direction of rotation R2 for actuating the second switch 214.

Depending on the rider's preferences, switching in both directions can thus be achieved by leaving the thumb in the recess-like structure 238 and actuating either the first or the third thumb engagement surface 231, 295.

Alternatively, switching in both directions can be achieved by changing the thumb between the first and the second thumb engagement surface 231, 232.

Pushing or pulling the different engagement surfaces 231, 232, 295, 298, 299 and 233 with the thumb or index finger results in numerous operating options for actuating the two switches 212 and 214.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. Bicycle operating apparatus for controlling at least one component of a bicycle, comprising:
   a carrier element to which a fastening device for fixing the bicycle operating apparatus to the handlebar of a bicycle is attachable,
   a housing, provided on the carrier element, having an electronic circuit arrangement accommodated in the housing, wherein a first and a second switch, which are each connected to the electronic circuit arrangement, are provided on the housing,
   an operating component, which is mounted on the carrier element so as to be pivotable about an operating axis and is preloaded into a neutral position, said operating component being able to be deflected out of the neutral position in a first direction of rotation about the operating axis in order to actuate the first switch, and being able to be deflected out of the neutral position in a second direction of rotation opposite to the first direction of rotation in order to actuate the second switch, wherein the operating component includes a first, a second and a third thumb engagement surface, which are each designed to be actuated by a thumb of an operator in order to trigger at least one of the first switch and the second switch, such that the first switch is actuable by actuating the first thumb engagement surface, the second switch is actuable by actuating the second thumb engagement surface, and one of the first and second switches is actuable by actuating the third thumb engagement surface without actuating the first thumb engagement surface.

2. The bicycle operating apparatus according to claim 1, wherein the first and the second thumb engagement surfaces are arranged at an angle of less than 30° to one another.

3. The bicycle operating apparatus according to claim 2, wherein the first and the second thumb engagement surfaces are arranged in an offset manner relative to one another both along the operating axis and in a direction perpendicular to the operating axis.

4. The bicycle operating apparatus according to claim 3, wherein at least one of the first and the second thumb engagement surface are formed on a respective radially or axially protruding operating protrusion.

5. The bicycle operating apparatus according to claim 1, wherein the third thumb engagement surface adjoins the first thumb engagement surface, and is configured such that the second switch is actuable by actuating the third thumb engagement surface, wherein the first and the third thumb engagement surface jointly form a recess for the operator's thumb.

6. The bicycle operating apparatus according to claim 5, wherein the third thumb engagement surface transitions into the first thumb engagement surface.

7. The bicycle operating apparatus according to claim 1, wherein actuating the first thumb engagement surface results in deflection of the operating component in the first direction of rotation, actuating the second thumb engagement surface results in deflection of the operating component in the second direction of rotation and actuating the third thumb engagement surface results in deflection of the operating component in the second direction of rotation.

8. The bicycle operating apparatus according to claim 1, wherein the operating component is formed as a single piece.

* * * * *